United States Patent [19]
Schrader

[11] 3,785,166
[45] Jan. 15, 1974

[54] ROOM AIR CONDITIONER FROST PROTECTION WITH BIMETAL CONTROL THERMOSTAT

[75] Inventor: Paul D. Schrader, Louisville, Ky.

[73] Assignee: General Electric Company, Louisville, Ky.

[22] Filed: July 10, 1972

[21] Appl. No.: 270,087

[52] U.S. Cl. .................................. 62/227, 62/262
[51] Int. Cl. .............................................. F25b 1/00
[58] Field of Search .................... 62/178, 179, 180, 62/186, 140, 227, 262

[56] References Cited
UNITED STATES PATENTS
3,640,087   2/1972   Harrison et al. ..................... 62/262

Primary Examiner—Meyer Perlin
Attorney—Walter E. Rule

[57] ABSTRACT

A room air conditioner comprising a refrigeration system including an evaporator, air circulating means, and a control thermostat is provided with a conduit for directing room air over the thermostat, the conduit being heat exchanged with the evaporator so that a frosting temperature of the evaporator prevents energization of the refrigeration system by the thermostat.

7 Claims, 3 Drawing Figures

ROOM AIR CONDITIONER FROST PROTECTION WITH BIMETAL CONTROL THERMOSTAT

BACKGROUND OF THE INVENTION

The present invention relates to room air conditioners including a single thermostat for controlling the normal cycling operation of the refrigeration system component of the air conditioner and for preventing operation of that component upon the sensing of a frosting evaporator temperature.

Normal control of a room air conditioning unit primarily requires a sensing of the temperature of the enclosure air entering the unit while frost-up protection employing a temperature sensing means requires the sensing of the evaporator temperature. Commonly used electrical controls for room air conditioners include gas or vapor filled bulb type thermostats, liquid filled bulb thermostats and bimetal thermostats. The liquid filled bulb type thermostats, which are the most expensive, have been used for both normal cycling control of the refrigeration system and for frost detection by placing the liquid filled bulb adjacent the air inlet side of the evaporator where it primarily senses air temperature but is cooled to an abnormally low temperature when frost restricts air flow through the evaporator. The electrical or switch components of the thermostat are, of course, placed in a convenient and electrically approved position as, for example, on the front of the air conditioner to one side of the air inlet.

The vapor filled bulb type thermostats and the bimetal thermostats have not heretofore been used for the dual purposes of normal cycling control and frost protection. Positioning of these controls on the front panel of the air conditioning unit has limited their use to the sensing of enclosure air temperature as is shown, for example, in Pat. Nos. 2,840,667—Atchison et al.; 2,970,455—Slattery; and 3,105,366—Atchison, in which the thermostats are positioned in the path of the enclosure air entering the unit. Another means for providing thermostat response to room temperature air is disclosed in Pat. No. 3,194,027—Prendergast et al. in which a tubular member is employed to bleed high pressure air from the plenum between the fan and the evaporator into engagement with a thermostat positioned outside of the air flow path. It has also been proposed, as shown in Pat. No. 3,411,311—Wegman, to position the thermostat chamber so that its heat conducting housing walls are cooled by refrigerated air flowing from the evaporator, this cooling of the chamber walls influencing the normal cycling control in an anticipatory fashion.

A general object of the present invention is to provide a room air conditioner including a control arrangement comprising a low cost thermostat, preferably a bimetal thermostat, adapted both to normally control the operation of the unit refrigerator system and to prevent operation of the system upon frosting of the evaporator component thereof.

SUMMARY OF THE INVENTION

In accordance with the preferred embodiment of the invention, there is provided an air conditioning unit for conditioning air from an enclosure comprising an air flow passage having an inlet and an outlet communicating with the enclosure. The unit includes a refrigeration system comprising an evaporator disposed in the air flow passage and a fan in the passage for withdrawing air from the enclosure and directing or discharging air through the evaporator. A bimetal thermostat control mounted on the inner or enclosure face of the unit is adapted to control both the normal cycling of the refrigeration system and to prevent operation of the system in the event of evaporator frosting. To this end, there is provided a tubular member having an inlet end disposed in the air passage means between the fan and the evaporator, i.e., in the evaporator plenum, an outlet end for directing air received by the tubular member onto the thermostat, and an intermediate section of the tubular member in intimate heat exchange contact with the evaporator so that the temperature of the enclosure air passing through the tubular member is affected or biased by the evaporator temperature. The heat exchange of the tubular member with the evaporator is sufficient to prevent operation of the refrigeration system whenever the evaporator is at frost build-up temperatures.

DESCRIPTION OF THE PREFERRED EMBODIMENT

Figure 1:
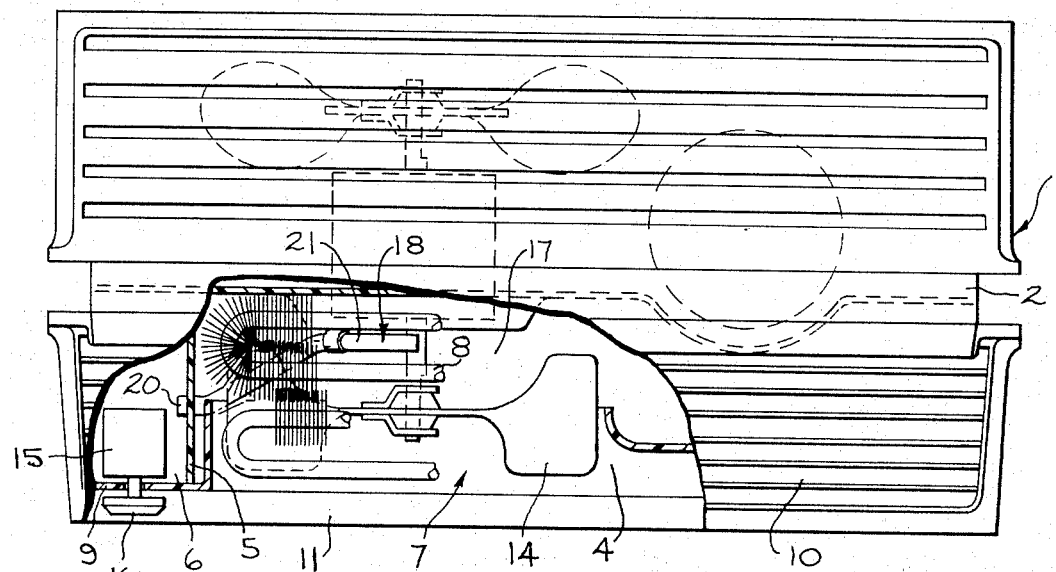
FIG. 1 is a top view of an air conditioning unit, partly in section, illustrating the present invention.
Figure 2:
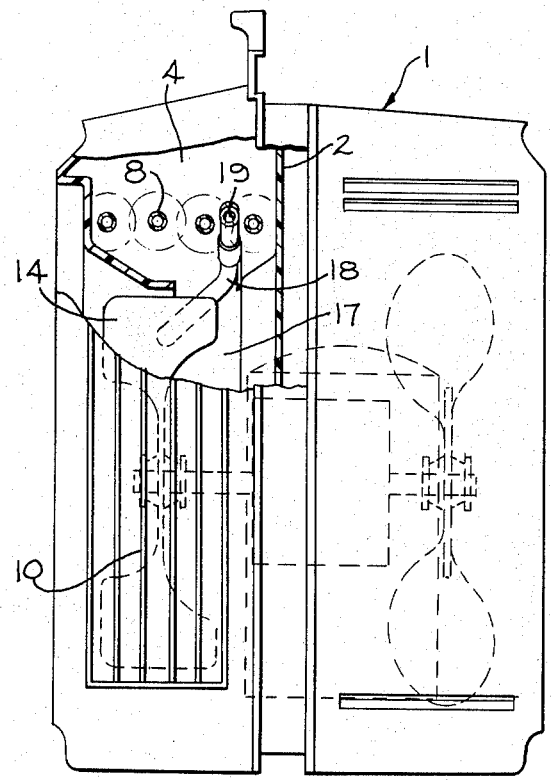
FIG. 2 is a side view, partly in section, of the unit of FIG. 1.
Figure 3:
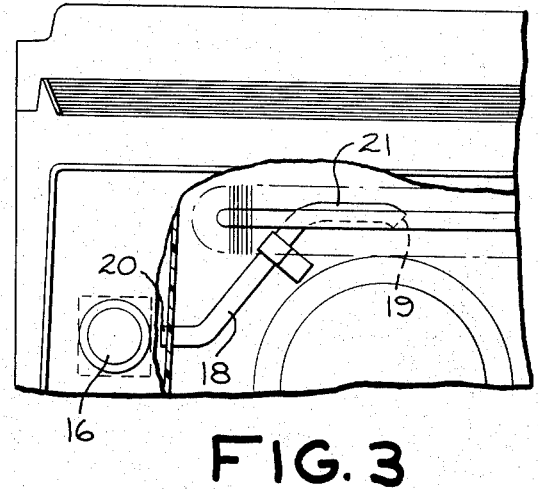
FIG. 3 is a front view, partly in section, of a portion of the unit of FIG. 1.

In the accompanying drawing, there is illustrated a room air conditioning unit of the window mounting type comprising an outer housing 1 divided by an interior partition 2 into an outdoor section 3 and an indoor section 4. The indoor section is further divided by a vertical partition 5 into a control chamber 6 and an air flow passage 7 containing an evaporator 8. The evaporator forms part of a closed refrigeration system including a condensing unit contained within the outdoor section 3.

The front or enclosure end of the air conditioning unit is provided with a grilled opening 11 for admitting enclosure air to the air flow passage 7 while the top of the unit has a grilled outlet opening 10 for returning conditioned air to the enclosure. Means for circulating enclosure air through the air flow passage comprises a fan 14 disposed adjacent the inlet opening 11, this fan being adapted to withdraw air from the enclosure and discharge air into the air flow passage and through the evaporator 8.

A low cost thermostat 15, preferably a bimetal thermostat, is contained within the control chamber 6, which is at atmospheric pressure, and is mounted on the front panel 10 of the unit, this thermostat 15 having a control knob 16 on the front exterior of the panel 9.

Means for conducting control air over the thermostat 15 comprises a tubular member 18, preferably of metal such as aluminum, disposed within the evaporator plenum portion 17 of the air flow passage 7 between the fan and the evaporator. The tubular member 18 has an inlet end 19 facing downwardly to prevent entrance of moisture from the evaporator and an outlet end 20 extending through the vertical partition 5 and toward the control thermostat 15. An intermediate portion of the tubular member 18, indicated by the numeral 21, is in intimate heat transfer contact with a portion of the evaporator 8 so that the enclosure air flowing from the high pressure plenum area through the tubular member 18 is cooled somewhat by this heat exchange, the degree of cooling depending upon the evaporator temperature.

In accordance with the present invention, the heat exchange between the evaporator 8 and the tubular member section 21 is sufficient so that if the evaporator temperature decreases to a frosting temperature, the resultant cooling of the air flowing through the tubular member 18 will cause the thermostat 15 to sense a temperature low enough to cause the thermostat to turn the refrigeration off and prevent if from being re-energized until the temperature of the evaporator has increased to a point where the frost has melted. This frost protection is augmented by the increased air flow through the tubular member 18 effected by an increased resistance to air flow through the frosted evaporator.

The biasing action of the evaporator on the temperature of the air flowing through the tubular member 18 also allows the use of a wider temperature differential bimetal thermostat for maintaining a given room or enclosure air differential. For example, a thermostat having a 5 or 6° operating differential can be employed for maintaining a 2 or 3° enclosure air differential. In other words, the biasing action of the evaporator is about 3°.

During normal cycling operation of the unit, the fan 14 is running continuously so that the thermostat 15 senses an air temperature which is enclosure air temperature biased by the evaporator temperature. Following initial startup, when the evaporator is at room temperature, this biasing effect is negligible. However, during the refrigeration cycle the evaporator decreases in temperature, and the evaporator cooling of the room air flowing through the tubular member 18 increases to provide an anticipatory effect. The thermostat thus turns the refrigeration system off before the temperature of the enclosure air flowing through or into the evaporator plenum has reached the turn-off temperature of the thermostat. Upon de-energization of the refrigeration system, room air flowing through the evaporator gradually warms the evaporator so that its biasing effect diminishes. As a result, the air flowing over the thermostat is substantially at enclosure temperature and the system is again energized.

Under somewhat abnormal operating conditions the evaporator temperature may decrease to a point at which frost accumulates on and within the evaporator structure. This will result in a decrease in air flow through the evaporator due to frost accumulation accompanied by an increased air flow through the tubular member 18. The air flowing through the tubular member will also be cooled to a greater degree, for example, as much as 10° by the frosted evaporator. The increased air flow over the thermostat and the increased temperature biasing action of the evaporator prevents re-energization of the refrigeration system until the evaporator has warmed to defrosting temperatures. Once the frost is removed, the system returns to normal cycling operation.

While there has been shown and described a specific embodiment of the invention, it will be understood that it is not limited thereto and it is intended by the accompanying claims to cover any modification falling within the true spirit and scope of the invention.

I claim:

1. An air conditioning unit for conditioning air from an enclosure comprising:
    an air flow passage having an inlet and an outlet communicating with said enclosure;
    a refrigeration system including an evaporator, said evaporator being disposed in said passage;
    air circulating means disposed in said passage between said inlet and said evaporator for circulating enclosure air through said evaporator;
    a thermostat including temperature sensing means for controlling operation of said refrigeration system, said thermostat being mounted outside said air flow passage;
    a metal tube having an inlet end disposed in said passage upstream from said evaporator for receiving a portion of the high pressure air flowing from said air circulating means to said evaporator and conducting said air portion over said temperature sensing means;
    a section of said tube ahead of said temperature sensing means being in heat exchange contact with said evaporator whereby the air passing through said tube is cooled by said evaporator;
    said heat exchange being sufficient to prevent said thermostat from operating said system when the temperature of said evaporator is below frosting temperatures.

2. An air conditioning unit according to claim 1 in which said thermostat is a bimetal thermostat.

3. An air conditioning unit for conditioning air from an enclosure comprising:
    means defining an air flow passage having an inlet and an outlet communicating with said enclosure and including an evaporator plenum;
    a refrigeration system including an evaporator disposed in said plenum;
    air circulating means disposed adjacent said inlet and upstream from said evaporator for withdrawing enclosure air and discharging the air into said plenum;
    a thermostat including temperature sensing means for controlling operation of said refrigeration system mounted on said unit adjacent and separate from said evaporator plenum;
    a metal tubular member having an inlet end disposed in said plenum between said air circulating means and said evaporator for receiving a portion of the air flowing from said air circulating means to said evaporator and an outlet end for directing said air portion over said temperature sensing means;
    a section of said tubular member being in heat exchange contact with said evaporator whereby the air passing through said tubular member is normally cooled by said evaporator;
    said heat exchange being sufficient to prevent operation of said refrigeration system during frosting of said evaporator.

4. An air conditioning unit according to claim 3 in which the inlet end of said tubular member slants downwardly.

5. An air conditioning unit according to claim 4 in which said thermostat is a bimetal thermostat disposed in a control chamber adjacent said plenum.

6. An air conditioning unit according to claim 4 in which said tubular member is aluminum.

7. An air conditioning unit according to claim 6 in which said evaporator portion extends across the top of said plenum.

* * * * *